Patented Jan. 20, 1931

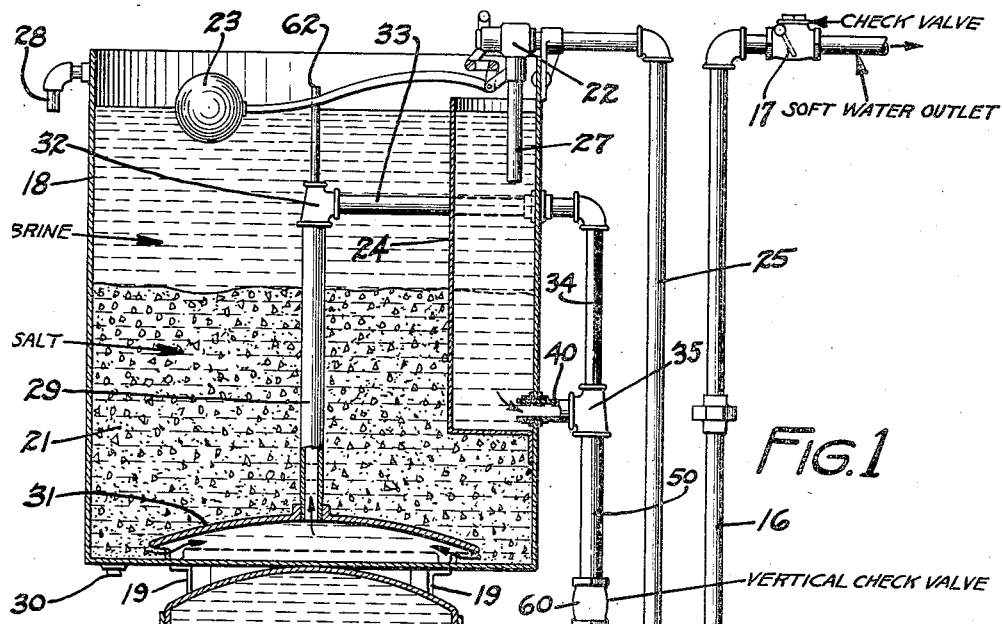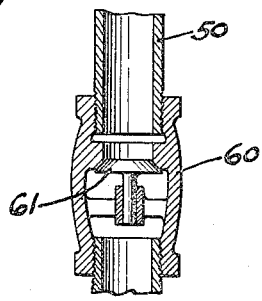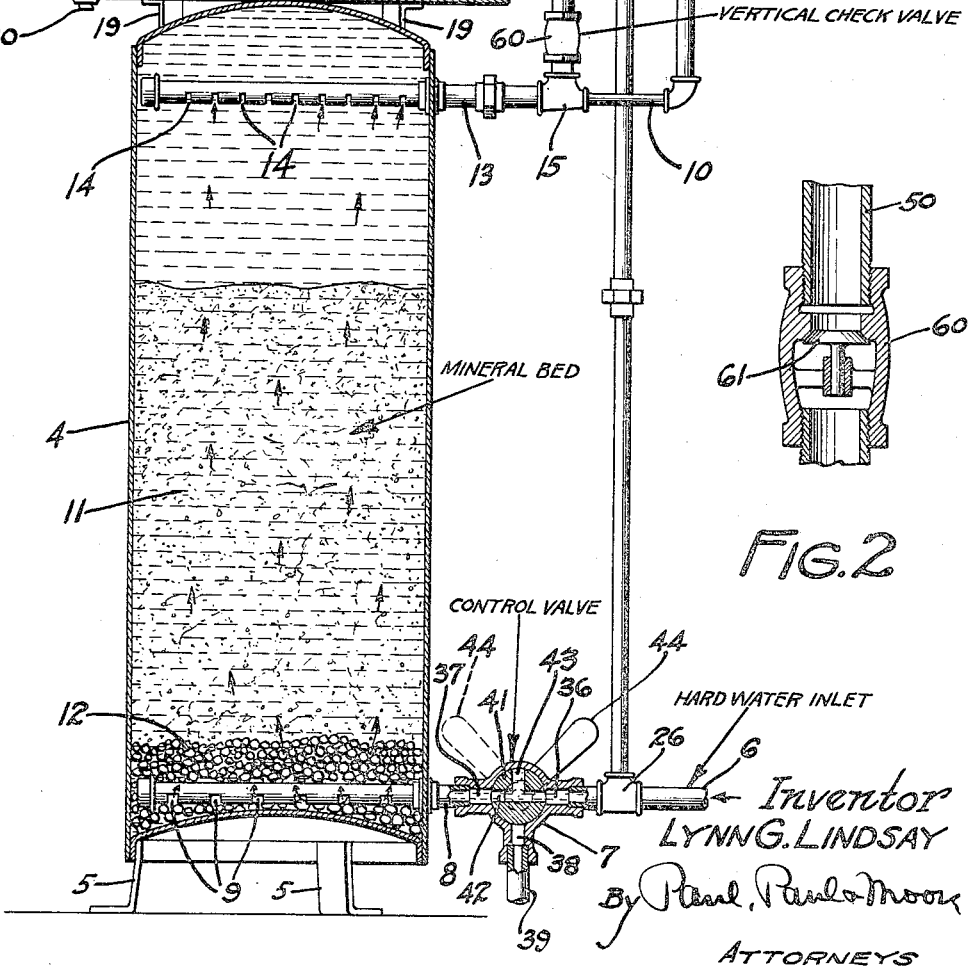

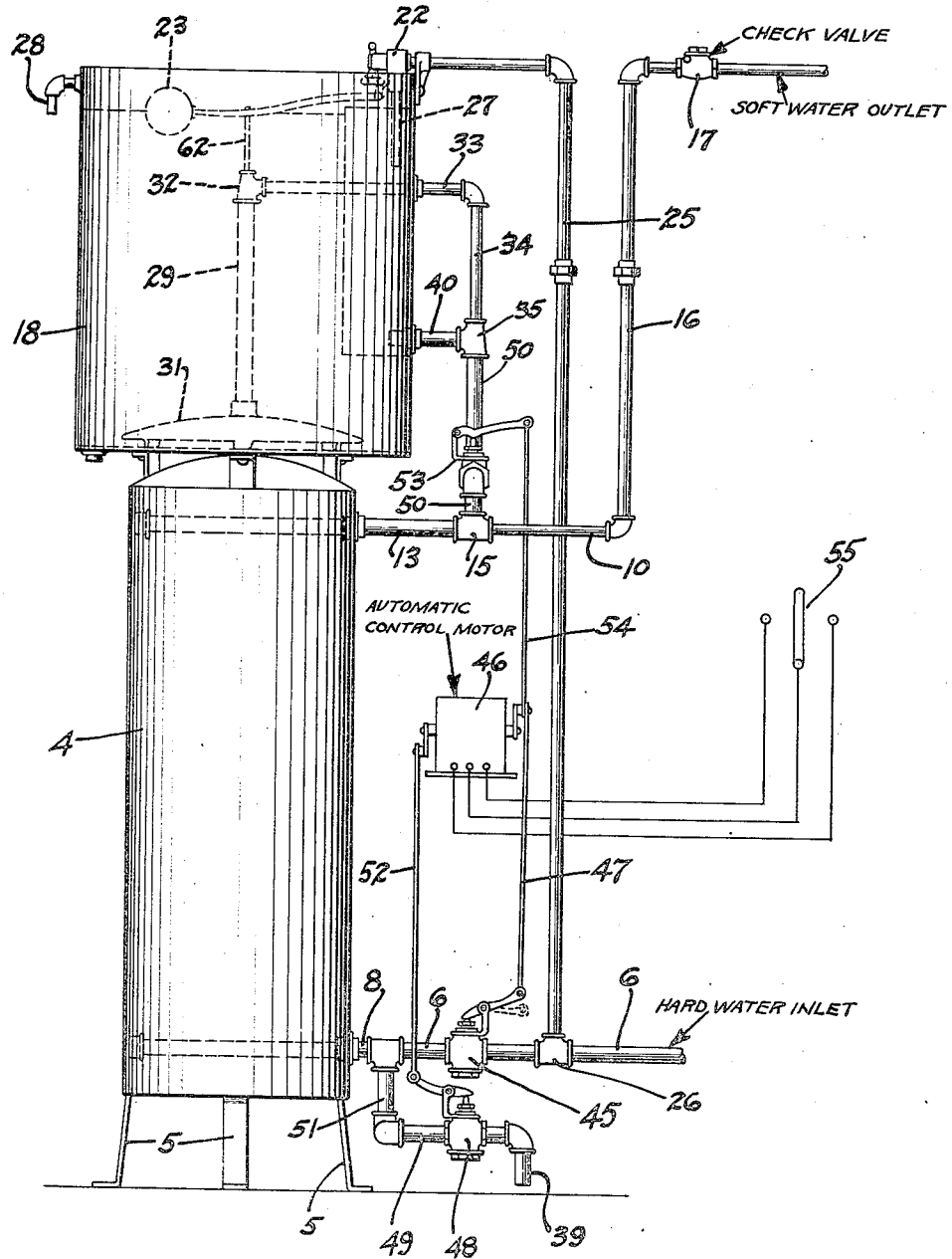

1,789,314

UNITED STATES PATENT OFFICE

LYNN G. LINDSAY, OF MINNEAPOLIS, MINNESOTA, ASSIGNOR TO TRUPAR MANUFACTURING COMPANY, OF DAYTON, OHIO, A CORPORATION OF OHIO

WATER SOFTENER

Application filed June 6, 1925. Serial No. 35,374.

This invention relates to new and useful improvements in water softeners particularly designed for use to soften the water delivered to homes and other buildings from the usual water mains of public or private systems, which water is usually hard, and more particularly relates to the control mechanism of such an apparatus.

Ordinary water softeners, such as are in common use at the present time, usually employ a pressure tank partially filled with zeolite, which may be either green sand or a synthetic material, thereby forming a mineral bed through which the hard water must flow in the process of softening. The hard water is introduced, under pressure, into the tank and flows through the mineral bed which functions to change the characteristics of the water so that the resultant flow from the tank will be soft. After a certain quantity of water has passed through the mineral bed the water softening characteristics thereof become exhausted; after which it becomes necessary to recondition or re-vivify the mineral bed in order to restore it to its original state so that it again will absorb the hardness of the water as it passes therethrough. The quantity of water which may be softened by passing through the mineral bed is governed by the volume of the mineral bed and the hardness of the water flowing therethrough. The usual method employed to recondition or restore the mineral bed to its original state consists of passing a solution of salt brine through the bed and discharging it into the sewer. After the salt brine has been thus passed through the mineral bed, a quantity of fresh water is passed through the bed to cleanse or wash the salt brine therefrom, after which it is again ready for use to soften hard water passed therethrough.

Water softeners, of ordinary construction, usually employ a plurality of control valves which must be manually operated each time it becomes necessary to recondition the mineral bed. These valves must be manipulated in their proper sequence in order to control the flow of brine and fresh water through the apparatus in the process of reconditioning the mineral bed. Such water softeners therefore are objectionable as it requires usually a careful study of the operation of the apparatus by the operator in order to properly control the flow of brine and water therethrough during the operation of reconditioning the bed. It is therefore desirable that a control mechanism be provided for use in conjunction with such water softeners which will be positive and fool-proof in operation, and which will also be so simple in operation that an inexperienced person may readily operate it to effect the reconditioning of the mineral bed.

The novel water softener and control mechanism featured in this invention is particularly designed to meet the above requirements. It is designed for either manual or automatic control. The manually operated control mechanism comprises but one valve which requires manipulation each time it is necessary to recondition the mineral bed. The automatically controlled water softener is provided with means whereby the flow of salt brine and water through the mineral bed is controlled by an automatically operable control motor mounted adjacent thereto, and the operation of which may be controlled by a suitable switch located at a remote point such, for instance, as in an upstairs room of the building, thereby eliminating the necessity of the operator or housewife having to make a trip to the basement each time it becomes necessary to recondition the mineral bed of the apparatus.

The particular object of the invention therefore is to provide an improved water softener having a simple control mechanism which will be positive and fool-proof in operation.

Other objects of the invention will appear from the following description and the accompanying drawings and will be pointed out in the annexed claims.

In the accompanying drawings there has been disclosed a structure designed to carry out the various objects of the invention but it is to be understood that the invention is not confined to the exact features shown, as various changes may be made within the scope of the claims which follow.

In the drawings:

Figure 1 is a sectional view of the improved water softener as arranged for manual control;

Figure 2 is an enlarged detail sectional view of the vertical check valve employed to prevent the soft water from entering the brine tank while the apparatus is in operation.

Figure 3 is a side elevation of the apparatus arranged for automatic control.

The novel water softener featured in this invention comprises a tank 4 preferably mounted upon suitable legs 5 as shown in Figure 1. Both ends of this tank are closed as shown so that the tank may be filled with water under pressure. The raw or hard water is delivered to the tank through a pipe 6 which is connected to the usual water supply pipe in the building. One end of the supply pipe 6 is connected to a control valve 7 which preferably is in communication with the lower portion of the tank through a pipe 8 which extends through the wall of the tank and substantially across the width thereof as shown. The portion of the intake pipe section 8 within the tank is preferably provided with a series of slots or openings 9 through which the water is discharged therefrom into the tank as indicated by the arrows. The discharge openings are preferably arranged in the bottom of the pipe section 8 so that the water softening material contained within the tank will not enter the pipe when the material is being reconditioned or revivified by passing a solution of salt brine therethrough, as will subsequently be described.

The tank 4 is preferably partially filled with a material 11, commonly known as zeolite which has the peculiar characteristic of causing the hard water flowing therethrough to become softened. The bottom of the tank is preferably covered with a coarse granulated substance 12 such as gravel, which is of such depth, preferably, as to completely cover the hard water intake pipe 8. This coarse material functions to prevent the finer material of the mineral bed to be discharged through the intake pipe 8 when the flow though the tank is reversed.

An outlet pipe 13, similar in construction to the intake pipe 8, is preferably mounted in the upper portion of the pressure tank. This outlet pipe is similarly provided at its bottom with a series of openings 14 through which the soft water may enter the pipe as indicated by the arrows. The pipe 14 is in communication with a T-coupling 15 which preferably has a relatively smaller pipe section 10 connected to the opposite end thereof. A pipe 16 is preferably connected to the pipe section 10 and leads therefrom to the usual house service line or pipe, not shown. The purpose of the smaller pipe section 10 is to restrict the passage between the T-coupling 15 and the pipe 16 as will hereinafter be described. A horizontal check valve 17 is interposed in the upper horizontal section of the pipe 16 to prevent the water contained in the pipes throughout the building from returning to the tank when the pressure is released therefrom during the process of reconditioning the mineral bed.

In the operation of the form of water softener as above described, the hard or raw water is introduced into the lower portion of the tank 4 through the supply pipe 6 and the control valve 7, after which it upwardly flows through the mineral bed as indicated by the arrows in Figure 1. Such flowing of the water through the mineral bed will cause the latter to remove or absorb the hardness contained therein so that the resultant flow of water through the outlet pipe 13 at the upper end of the tank will be soft. After a certain quantity of water has passed through the tank, the zeolite material therein loses its water softening characteristic, after which it becomes necessary to recondition or revivify the mineral bed in order to restore it to its original state so that it will again become effective to soften the water passing therethrough. Means are therefore provided for thus periodically revivifying the mineral bed after a certain quantity of water has been passed therethrough and it becomes ineffective as a water softener.

The means provided for thus reconditioning the mineral bed preferably consists in the provision of a brine tank 18 preferably mounted over the pressure tank 4 and secured thereto by such means as the brackets 19. This tank is partially filled with a coarse granular substance 21 such as rock salt, after which it is practically filled with water so that the salt will be submerged as shown in Figure 1. The level of the water in the brine tank 18 is controlled by means of a ball float valve 22, of ordinary construction, preferably mounted in the upper portion of the brine tank. This valve is provided with the usual float 23 which functions to actuate the operating mechanism of the valve to control the flow of water therethrough as the water or brine level in the tank raises and lowers.

An auxiliary tank 24, relatively small in size, is preferably mounted within the brine tank 18 beneath the ball valve 22. This auxiliary tank may be secured to the walls of the brine tank as shown. The ball valve 22 is supported upon the upper portion of a pipe 25 which leads downwardly therefrom and has its lower end connected to the supply pipe 6 by means of a pipe fitting 26, thereby establishing communication between the ball valve 22 and the raw water supply pipe 6. It will, therefore, be seen that when the valve 22 is open, hard water will flow through the pipe 25, valve 22 and through a pipe section 27, connected to the valve, and into the auxiliary tank 24. The opening and closing of the ball valve 22 is controlled by the level of the water or brine in the brine tank 18 as will hereinafter be described in detail. The brine tank 18 is preferably provided with an overflow pipe 28 and a drain plug 30 as shown.

The means provided for conducting the brine solution from the brine tank into the upper portion of the tank 4 resides in the provision of a pipe section 29 having a convex disc or plate 31 secured to the lower end thereof, and which disc is spaced from the bottom wall of the tank 18 so as to provide an annular opening therebeneath through which the brine may flow into the pipe 29 as indicated by the arrows in Figure 1. The purpose of the disc 31 is to prevent the particles of salt contained in the brine tank from entering the pipe 29 during the operation of reconditioning the mineral bed 11 in the pressure tank 4. A pipe fitting 32 is mounted upon the upper end of the pipe 29 and has a horizontal pipe section 33 connected thereto which outwardly projects through an aperture provided in the wall of the brine tank 18. A pipe 34 connects the pipe 33 with a similar pipe fitting 35 having a relatively larger connection 40 connected with the lower portion of the auxiliary tank 24. A pipe section 50, of substantially the same diameter as the connection 40, leads from the fitting 35 to one side of a vertical check valve 60 having its other end in connection with the pipe fitting 15, and therefore the soft water discharge pipe 13 of the pressure tank 4. The check valve 60 is of ordinary construction, and comprises the usual valve 61 movably mounted therein and adapted to be held in closed position by the pressure of the soft water flowing through the discharge pipe 13, reduced pipe section 10 and the pipe 16 leading to the horizontal check valve 17. (See Fig. 1).

In the operation of this novel water softener, a predetermined quantity of brine is preferably drawn off from the brine tank 18 and discharged into the upper portion of the pressure tank during the operation of reconditioning the mineral bed. The location of the pipe 33 in the brine tank is such that the minimum brine level in the tank 18 will always be sufficient to substantially cover or submerge the salt particles contained therein as shown.

The level of the brine in the tank 18 is therefore controlled and regulated by the vertical location or level of the horizontal pipe section 33 which is in communication with a vent pipe 62 mounted in the T-fitting 32 and which vent pipe cooperates with the pipe section 33 to regulate the level of the brine in the tank. The upper end of the vent pipe 62 projects above the normal level of the brine in the tank 18, in order to prevent comparatively fresh water in the upper portion of the brine tank from flowing into the pipe 33. When the pressure in the soft water discharge pipe 13 is lowered by cutting off the supply of hard water to the tank, the weight of the water in the vertical pipe section 50, leading from the upper portion of the vertical check valve, will be sufficient to cause the valve 61 to be moved downwardly into open position, thereby allowing the brine to flow by gravity from the bottom of the tank 18 through the pipes 29, 33, 34, pipe fitting 35, pipe section 50, vertical check valve 60, T-fitting 15 through the pipe section 30 and into the upper portion of the pressure tank 4. As soon as the brine in the tank reaches the level of the horizontal pipe section 33, air will be drawn into this pipe through the vent pipe 62, thereby preventing siphon action from being started, with the result that the flow of brine from the tank 18 will be interrupted.

An important feature of this novel water softener resides in the arrangement of the three-way control valve 7 which provides the only means requiring any attention during the operation of revivifying the mineral bed in the pressure tank 4. This valve, it will be noted, is provided with an inlet 36 and an oppositely arranged outlet 37 which is in communication with the pipe section 8 leading into the bottom of the tank 4. The valve is also provided with an outlet 38 having a drain pipe 39 connected thereto which preferably has its opposite end connected to the sewer drain. A three-way rotor 41 is mounted in the valve 7 so that the flow of water through the valve may be caused to flow from the supply pipe 6 into the tank or from the tank back to the valve and into the drain pipe 39. A port 42 is provided in the rotor which, when in the position shown in Figure 1, establishes communication between the supply pipe 6 and the tank so that the hard water will be delivered to the tank under pressure. A relatively shorter port 43 is also provided in the rotor which leads from the port 42 through one side of the rotor so that when the operating lever 44, connected to the rotor, is shifted from the full line to the dotted line position in Figure 1, the hard water supply will be shut off from the tank and the port 43 will be brought into registration or alinement with the outlet 37 in the valve casing. Such rotation of the rotor 41 will also cause one end of the port 42 to be moved into alinement with the outlet 38 of the valve casing, thereby establishing communication between the tank and the drain pipe 39 with the result that the water in the tank will drain therefrom through the valve 7, drain pipe 39 and into the sewer.

In the operation of this novel water softener, the three-way valve or cock 7 at the bottom of the tank will be opened to the position shown in Figure 1, thereby allowing the hard water to flow into the tank and upwardly through the mineral bed as indicated by the arrows. When water is drained or tapped from service lines in the building, soft water in the upper portion of the tank 4 will flow into the pipe 13, thence upwardly through the pipe section 16 and through the horizontal check valve 17 into the service line. During such normal operation of the apparatus, the vertical check valve 60 will remain closed as a result of the water exerting a pressure against the lower side of the valve 61. After the softener has been in use for a certain length of time, the mineral bed in the tank 4 will become ineffective as a water softener, and it then becomes necessary to recondition or revivify the mineral bed before it can again be used as a water softener. This is accomplished by passing a solution of brine through the bed and subsequently flushing or rinsing the brine from the zeolite or material comprising the mineral bed.

When it becomes necessary to thus revivify the mineral bed, the lever 44 of the control valve 7 is moved from the full to the dotted lines position shown in Figure 1, thereby interrupting the flow of hard water to the tank and allowing the water remaining in the pressure tank to flow therefrom through the pipe section 8, valve 7, and into the drain pipe 39 for final discharging therefrom into a suitable discharge such as a sewer. As soon as the pressure in the tank 4 has been lowered, caused by the interruption of the flow of hard water thereto by manipulation of the valve 7, and as a result of the water draining therefrom, the vertical check valve 60 will be opened by the weight or pressure of the salt solution tending to force it open. Such opening of the valve 60 will allow the brine to flow by gravity from the tank 18 through the vertical pipe 29, pipe sections 33 and 34, fitting 35, pipe 50, vertical check valve 60, pipe section 13 and into the upper portion of the tank 4; thence downwardly through the mineral bed and into the pipe section 8 from which it will flow through the open valve 7 and into the drain pipe 39. As the brine thus flows from the tank 18 into the lower tank 4, the level in the upper tank will obviously be lowered resulting in the opening of the ball valve 22, thereby causing hard water to be discharged into the auxiliary tank 24 through the vertical pipe 25 and pipe section 27. The water will flow from the tank 24 through the connection 40 and into the pipe 50, thence through the vertical check valve 60, thereby causing it to mix with the brine flowing therethrough into the tank 4.

It will be noted by reference to Figure 1, that the pipe sections 33 and 34 are of a relatively smaller diameter than the connection 40 leading from the bottom of the tank 24 to the pipe 50, thereby causing the brine to flow into the pressure tank much slower than the supply of raw or hard water is being discharged into the tank 24 from the pipe 27. As soon as the level in the tank has been lowered to the level of the brine horizontal pipe section 33, air will enter the pipe 33 and interrupt the flow of brine therethrough, after which the hard water being discharged into the tank 24 from the valve 22 will continue to flow into the pressure tank and through the mineral bed until the latter has been thoroughly washed. Such flow of water through the mineral bed will continue until the three-way valve is again actuated by throwing the lever 44 from the dotted to the full line position, as shown, after which hard water will again be introduced into the pressure tank. Such introduction of the hard water into the pressure tank will cause a pressure to be built up therein which in turn will cause the check valve 60 to be closed after which the apparatus is again in normal condition ready for use. The closing of the vertical check valve 60 is rendered more positive as a result of the restricted passage through the pipe section 10, which tends to build up a back pressure in the pipe section 13. It will also be noted that as a result of the pipe 25 being connected to the supply pipe 6, ahead of the control valve, hard water will continue to flow into the auxiliary tank 24 and from thence will overflow into the brine tank until the water in the brine tank reaches a level which will cause the ball 23 of the valve 22 to effect the closing of the valve, thereby interrupting the supply of fresh water thereto.

From the foregoing, therefore, it will readily be seen and understood that the operation of revivifying the mineral bed is controlled wholly by manipulation of the single three-way valve 7. By shifting this valve from the full to the dotted line position, the water in the pressure tank will be drained therefrom and a solution of brine passed through the mineral bed which will be followed by a flushing of hard water therethrough which functions to rinse the brine from the mineral bed so that when the control valve is again manipulated to admit hard water, into the tank, the apparatus will again be ready for use. It will also be seen that the draining of the brine from the tank 18 and into the pressure tank and the supply of hard water thereto during each operation of revivifying the mineral bed, will be entirely automatic.

Thus it will be seen that the complete cycle of operation of revivifying the mineral bed which consists of passing the brine through the bed and thereafter flushing it with hard water, and then again supplying the brine tank with additional water, will be controlled by the simple manipulation of the three-way valve 7.

Figure 3 illustrates the novel water softener as arranged for automatic remote control. In the construction here shown the three-way control valve 7, shown in Figure 1, is dispensed with and in place thereof a valve 45, of ordinary construction, such for instance as a whistle valve, is interposed in the hard water supply pipe 6. This valve is operatively connected to a control motor 46 by means of a connecting rod 47 as shown in Figure 2. The control motor 46 may be of any of the well-known types, such as an electrically operated, spring actuated or a water motor. A similar valve 48 is also in communication with the supply pipe 6 through the pipe sections 49 and 51. This latter valve controls the flow of water and brine from the tank 4 to the drain or sewer. The valve 48 in like manner is operatively connected to the opposite side of the control motor by means of a connecting rod 52. These valves are so arranged and connected to the motor 46 that they will alternately open and close when the crank arms of the motor are rotated. In Figure 2, it will be noted that the valves are in normal operative position, in which position the valve 45 will be open to permit the flow of hard water to the tank, and the lower valve 48 will be closed to prevent the water draining therefrom.

It will also be noted by referring to the upper portion of Figure 2, that the vertical check valve 60, shown in Figure 1, has been dispensed with and a whistle valve 53 substituted therefor. This valve is operatively connected to the motor 46 by a connecting rod 54 so that each time the valve 48 is opened, the upper valve 53 will also be opened to permit the salt solution in the tank 18 to flow into the upper portion of the pressure tank 4. The substitution of the upper whistle valve 53 in place of the vertical check valve 60 is primarily for the purpose of rendering the control mechanism absolutely positive in operation. By the employment of the three-valves 45, 48 and 53, it will readily be understood that when the control motor 46 is actuated, all of the valves will be simultaneously operated by a positive movement, thereby eliminating all danger of any of the valves becoming inoperative when the control motor is actuated.

The form of control motor shown in Figure 3 is of the electrically controlled type, having a suitable switch 55 electrically connected thereto which may be placed at a remote point from the water softener so that each time it is desired to revivify the mineral bed, the operator will simply manipulate the switch 55 which will cause the control motor 46 to automatically open and close the valves as required during the operation of revivifying the mineral bed.

In the operation of the automatically controlled structure shown in Figure 3 the valve 45 will normally be in open position and the valves 48 and 53 in closed position, thereby permitting the hard or raw water to flow into the pressure tank 4 and upwardly through the mineral bed in a manner similar to that shown and described with reference to Figure 1. When it becomes necessary to revivify or recondition the mineral bed, the switch 55 will be manipulated, causing the control motor 46 to operate with the result that the valve 45 will be closed and the two valves 48 and 53 will be opened. Such operation of the three valves will cause the circulation through the apparatus to be similar to that shown in Figure 1, when the operating lever 44 is in the dotted line position. Thus it will be seen that the operation of revivifying the mineral bed of the lower tank 4 will be substantially the same as that shown in the manually controlled structure shown in Figure 1, with the exception, of course, that it will be automatically controlled by the motor 46 by simply manipulating the switch 55.

From the foregoing, therefore, it will readily be understood that by the employment of the novel control mechanism featured in this invention, the operation of a water softener will be greatly simplified and improved. In the manually operated structure shown in Figure 1, it is only necessary to operate the three-way valve or cock 7 in the operation of revivifying the mineral bed, and in like manner in Figure 2 it is only necessary to actuate the control switch 55 to start and stop the control motor 46. In the accompanying drawings there is also shown a structure wherein the brine tank 18 is shown mounted upon the pressure tank. This, however, is a constructional detail and it is, therefore, to be understood that the location of the brine tank and other details of construction may be varied in many ways from that shown, without departing from the scope of the invention.

I claim as my invention:

1. A water softener comprising a pressure tank having a mineral bed therein, hard water intake and waste water pipes connected with the tank, a soft water pipe also connected with the pressure tank, a brine tank having a pipe connection with the pressure tank including a horizontal portion lying below brine level for positively determining the amount of brine to be withdrawn, valves respectively for controlling flow of hard water to the pressure tank and discharge of water therefrom, a third valve normally closing the connection between said pressure tank and said brine tank when the pressure tank is discharging through the soft water pipe, and common means connected with all valves for simultaneously operating the same to open one valve to permit passage of brine to said pressure tank as said hard water control valve is closed and said waste pipe valve is open.

2. A water softener comprising a pressure tank having a mineral bed therein, hard water intake and waste water pipes connected with said tank, a soft water pipe also connected with said pressure tank, a brine tank having a pipe connection with said pressure tank including a horizontal portion lying below brine level, a pipe connecting with said horizontal portion and extending above the brine level, valves for controlling the flow of hard water to said pressure tank, and the discharge of waste water therefrom, and a valve normally closing the connection between said pressure tank and said brine tank when said pressure tank is discharging through said soft water pipe, a control means connected for substantially simultaneous operation, respectively to open said pipe connection to the passage of brine to said pressure tank, when said hard water control is closed, and to open said waste water discharge pipe.

3. A water softener comprising a pressure tank having a mineral bed therein, a hard water intake and waste water pipes connected with said tank, a soft water pipe also connected with said pressure tank, a brine tank having a pipe connection with said pressure tank, said connection having a constricted portion, valves for controlling the flow of hard water to said pressure tank and the discharge of the water therefrom, and a valve normally closing the connection between said pressure tank and said brine tank when said pressure tank is discharging through said soft water pipe, a remotely operable driving means, and connections between said driving means and the hard water intake and waste water discharge, and brine tank discharge valves for substantially simultaneously operating the same to obtain the results stated.

4. A water softener comprising a pressure tank having a mineral bed therein, hard water intake and waste water pipes connected with said tank, a soft water pipe also connected with said pressure tank, a brine tank having a pipe connection with said pressure tank through the soft water pipe, valves for controlling the flow of hard water to said pressure tank and the discharge of the waste water therefrom, and a valve normally closing the connection between said pressure tank and said brine tank when said pressure tank is discharging through said soft water pipe, common means connecting with all valves for substantially simultaneously operating the same to permit flow from the brine tank, discharge of the waste water and closure of the hard water control means and closure to hard water supply, and said brine tank having a pipe connection with said hard water pipe and a valve and float therefor controlled by the brine level in the brine tank for automatically admitting fresh water thereto while the brine is being discharged therefrom.

5. A water softener comprising a pressure tank having a hard water intake pipe and waste water discharge, a soft water discharge pipe also connected with said pressure tank, a brine tank having a pipe connection with said pressure tank through the soft water pipe for delivering brine thereto, a valve for normally closing said pipe connection to the flow of brine to said tank, valves adapted to control the flow of hard water into said pressure tank and the discharge of waste water therefrom, said valves connected to a common prime mover for substantially simultaneous operation by said prime mover to admit brine to the pressure tank and to cut off the flow of hard water to said pressure tank and open said tank to waste water discharge.

6. A water softener comprising a pressure tank having a hard water intake pipe and a waste water discharge, a soft water discharge pipe also connected with said pressure tank, a brine tank having a pipe connection with said pressure tank for delivering brine thereto, said connection having a horizontal portion within the brine, and a vertical constricted portion, a valve in said pipe connection normally closing the same to the flow of brine to said tank, valves for controlling the flow of hard water to the pressure tank and discharge of waste water therefrom and means for simultaneously operating said valve means to admit brine to the pressure tank and cut off flow of hard water to the pressure tank and permit waste water discharge therefrom.

7. A water softener comprising a pressure tank having a mineral bed therein, hard water intake and waste water discharge pipe for said tank, a soft water discharge pipe for said pressure tank, valves respectively for controlling the flow of hard water to the pressure tank and discharge of waste water therefrom, a brine tank above the pressure tank, pipe connections between said tank and the soft water discharge pipe, a valve normally closing the connection between soft water discharge pipe and the brine tank, when the pressure tank is discharging soft water, and a single valve operating means connected with the valve, to simultaneously operate all valves to open said connection for flow of brine to the pressure tank, after the hard water control valve is closed, and after said waste control valve is opened.

8. A water softener comprising a pressure tank having a mineral bed, hard water intake and waste water discharge pipes for said tank, and valves therefor, a soft water discharge pipe for the pressure tank, a brine tank, an overflow pipe for said brine tank leading to said soft water pipe and having a horizontal portion in the brine, and further having a constricted portion between the horizontal portion and the soft water pipe, a valve normally closing the overflow pipe when the pressure tank is dicharging soft water, and valve operating means adapted to simultaneously operate all valves to open the brine tank connection to the soft water pipe to permit flow of brine to the pressure tank, as and when the hard water control valve is closed, and said waste control valve is opened.

9. A device of the class described comprising a pressure tank having hard water intake and waste water pipes and a soft water delivery pipe, and a valve for each, a brine tank superposed upon the pressure tank, a brine delivery conduit leading upwardly from the bottom of the brine tank and having a horizontal portion normally lying below the brine level for determining the quantity of brine discharged from the tank, said horizontal portion connecting with a descending portion and communicating with the soft water pipe, and a pipe extending above the brine level and connecting with the upwardly leading portion for preventing siphon action in the brine drain pipe after the brine reaches the horizontal pipe level, and a valve in the descending brine conduit.

10. A device of the class described comprising a pressure tank having hard water intake and waste water pipes and a soft water delivery pipe, and a valve for each, a brine tank superposed upon the pressure tank, a brine delivery conduit leading upwardly from the bottom of the brine tank and having a horizontal portion normally lying below the brine level for determining the quantity of brine discharged from the tank, said horizontal portion connecting with a descending portion and communicating with the soft water pipe, and a pipe extending above the brine level and connecting with the upwardly leading portion for preventing siphon action in the brine drain pipe after the brine reaches the horizontal pipe level, and a valve in the descending brine conduit, a motor and connections between the motor and valves for substantially simultaneously operating the same to open the brine drain connection, open the waste pipe and close the hard water supply.

11. A device of the class described having hard water intake and waste water discharge pipes at the bottom, each having a control valve and further having a soft water delivery pipe at the top, a brine tank above said pressure tank having a fresh water supply tank therein, said fresh water supply tank having an outlet pipe, a fresh water intake pipe for said fresh water supply tank controlled by a float valve having its float in the brine tank adapting the valve to be opened when the brine level is lowered, a brine delivery conduit leading from the brine tank and comprising ascending, horizontal, and descending pipe sections, said ascending section having an extension of small caliber projecting above the normal brine level to prevent siphon action through the brine delivery conduit, said descending section communicating with the fresh water supply tank outlet, and being of smaller caliber than said outlet to obtain a slower rate of flow than said outlet; a connector pipe of larger caliber than said descending brine pipe connecting both outlets with the soft water delivery pipe and a brine valve normally closing said connector pipe when the soft water pipe is delivering.

12. A device of the class described having hard water intake and waste water discharge pipes at the bottom, each having a control valve and further having a soft water delivery pipe at the top, a brine tank above said pressure tank having a fresh water supply tank therein, said fresh water supply tank having an outlet pipe, a fresh water intake pipe for said fresh water supply tank controlled by a float valve having its float in the brine tank adapting the valve to be opened when the brine level is lowered, a brine delivery conduit leading from the brine tank and comprising ascending, horizontal, and descending pipe sections, said ascending section having an extension of small caliber projecting above the normal brine level to prevent siphon action through the brine delivery conduit, said descending section communicating with the fresh water supply tank outlet, and being of smaller caliber than said outlet to obtain a slower rate of flow than said outlet, a connector pipe of larger caliber than said descending brine pipe connecting both outlets with the soft water delivery pipe and a brine valve normally closing said connector pipe when the soft water pipe is delivering, and means remotely controllable connecting the said valves for substantially simultaneously operating the same to close the hard water intake and open waste water and brine valves.

In witness whereof, I have hereunto set my hand this 3rd day of June, 1925.

LYNN G. LINDSAY.